United States Patent Office 3,494,890
Patented Feb. 10, 1970

3,494,890
PROCESS FOR PRODUCING POLYTRIMELLIT-IMIDES USING PHENOL SOLVENTS AND ALKYLENE OXIDES AS HYDROGEN HALIDE SCAVENGERS
Edwin F. Morello, Hammond, Ind., assignor to Standard Oil Company, Chicago, Ill., a corporation of Indiana
No Drawing. Filed June 21, 1968, Ser. No. 738,814
Int. Cl. C08g *20/32, 20/00;* H01b *3/30*
U.S. Cl. 260—47                  10 Claims

ABSTRACT OF THE DISCLOSURE

An improved process for producing soluble polymers for use as a polyamide-imide wire enamel at baking temperatures of about 400° F. In a process where wire enamels are produced from an equimolar reaction of an acid halide of a benzene tricarboxylic acid anhydride and an aromatic primary diamine in an alkyl substituted phenol or phenol medium, the improvement in said process comprising reacting the tricarboxylic acid halide and diamine at a temperature of about 50 to about 100° C. under vacuum of about 50 to 200 mm. of mercury to partially remove the entrained hydrogen halide and then scavenge the entrained hydrogen halide with an alkylene oxide consisting of about 2 to 4 carbon atoms in a straight chain, thus reducing the corrosive tendencies of said hydrogen halide and improving the properties of said polymer.

---

This invention relates to a novel process for preparing aromatic polytrimellitamide-imide polymers and their use of producing insulation on wire and other surfaces and more particularly to the improved process for preparing wire enamels using alkyl substituted phenols or phenol.

The polymers may be described as polyamides having some polyimide linkages; said polyamides are capable, when heated, of conversion to the polyamide-imide form. Such polyamides are high molecular weight polymeric compounds having in their molecules units of

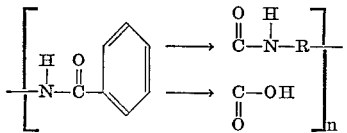

wherein → denotes isomerism and wherein R is a divalent aromatic organic radical. This organic radical consists of R' divalent aromatic hydrocarbon radicals joined by stable linkages —O—, —CH$_2$—,

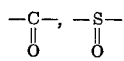

and —S—, as are in the groups —R'—OR'—, —R'CH$_2$—R',

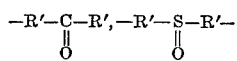

and R'—S—R'—. The molecular weight of these polyamides is sufficiently high to produce upon heating a film-forming polymer. Said amides are susceptible to condensation by heating to a polyamide-imide having to a substantial extent recurring units of

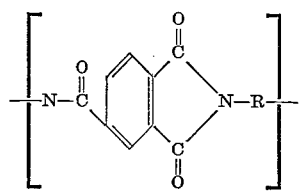

wherein R is a divalent aromatic organic radical in which in addition to hydrogen, nitrogen, sulfur and oxygen atoms can be attached to the carbon atoms. This organic radical consists of R', which is a divalent aromatic hydrocarbon radical or two R' divalent aromatic hydrocarbon radicals joined by stable linkages —O—, —CH$_2$—,

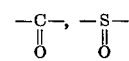

and —S—, as are in the groups —R'—O—R', —R—CH$_2$—R'—,

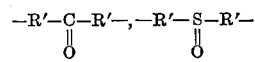

and R'—S—R'—.

The prior art polytrimellitamide polymers have been prepared in organic solvents containing nitrogen. When phenol or alkyl substituted phenols such as ortho, meta or para-cresols, xylenols, either singly or as mixtures thereof have been used, there has been a problem in eliminating the hydrogen halide which is a reaction by-product of the acid halide of a benzene tricarboxylic acid anhydride and an aromatic primary diamine. It has been found that the hydrogen chloride evolved by the reaction of the acid halide of benzene tricarboxylic acid anhydride with a primary diamine cannot be readily removed in gaseous form. In U.S. Patent 3,347,828 it is shown that alkylene oxide can be used to remove the hydrogen halide. When using phenol or alkyl substituted phenols, such as ortho, meta or para-cresol, known as cresylic acid, this processing is not possible since an interaction of the acid halide of the benzene tricarboxylic acid anhydride with this cresylic acid occurs, necessitating in the use of much higher temperature, but if this is done, polymer degradation occurs in the process. Additionally if the entire stoichiometric amount of scavenger is post-added as taught in U.S. Patent 3,347,828, gellation occurs.

It has been discovered that when the reaction of the acid halide of benzene tricarboxylic acid anhydride with the aromatic primary diamine is carried out at a temperature of about 25 to 50° C. and then heating the reaction mixture at about 70 to 100° C. under vacuum of about 100 to 120 mm. of mercury to partially remove the entrained hydrogen halide and then treating the mixture with alkylene oxide containing about 2 to 4 carbon atoms in a straight chain, thus reducing the corrosive tendencies of the hydrogen halide and improving the properties of the polymer.

According to the process of this invention an acyl derivative of the benzene tricarboxylic acid anhydride and an aromatic diamine are reacted in the presence of phenol, or alkyl substituted phenols such as ortho, meta or para-cresol, serving as a solvent for the reaction to produce the polyamide-imide. The temperature of the reaction is about 25 to about 100° C., preferably about 30 to about 50° C. Once the soluble polymer has formed, the temperature of the reaction mixture is raised to about 60 to 80° C. under vacuum of about 100 to 150 mm. of mercury, preferably with an air bleed of 7 to 100 cc. per minute. The rate of hydrogen chloride removal can be followed by standard methods of chlorine analysis. This elevated temperature is retained for about one half to about one hour and then at a temperature of about 90 to 100° C. to allow reduction of the hydrogen halide level to about 30%. After this period the temperature is reduced to about 20 to 30° C. and alkylene oxide is added, using to about zero to 10% excess. The amount of alkylene oxide added is calculated from the acid Titer Value. The polymers as formed have an amide content which varies from 55 to 100% and the imide content is from 0 to 45 percent. The polyamide-imides after heat curing theoretically contain 50 percent amide linkages and 50 percent imide linkages.

The first type of the polymers of the invention may be defined as those soluble in organic solvents and capable of further reaction upon application of heat. They may be employed in solution, in high solids suspensions, or as powders in the production of coatings, laminates, films, fibers, molded products and as impregnating varnishes. The second type of polymers—the polyamide-imides—are much less soluble than the amides and when they have been heat cured they are generally insoluble in organic solvents and may be regarded as cured end-product in the way of coatings, laminates, films, enamel-wire coatings and the like. The latter are characterized by resistance to solvents, by high thermal stability and good electrical characteristics.

According to the process of this invention, the polyamide products are prepared by reacting acyl halide derivatives of trimellitic anhydride (1,2,4-benzene tricarboxylic acid anhydride) with an aromatic primary diamine in the pressure of aromatic carbocyclic alcohols as solvents. The preferred primary aromatic diamines are p,p'-methylenebis (aniline) and p,p'-oxybis(aniline). The preferred solvents are phenol, o-, p-, m-cresols, xylenols, either singly or as mixtures thereof commonly known as cresylic acids. The usual solvent contains about 48–55% phenol, 15–33% ortho, meta and para-cresol and 9–18% xylenols and about 5% other C9 substituted phenols. The phenol or alkyl substituted phenols may be diluted up to 30% with aromatic hydrocarbons. The preferred hydrocarbons are xylene, toluene and commercial aromatic hydrocarbon fractions.

The aromatic polytrimellitamide solution suitable for producing a wire coating at elevated temperatures comprises about 12 to about 30 weight percent of said polytrimellitamide and a phenol or alkyl substituted phenol as a solvent. The phenol or alkyl substituted phenols may be diluted up to 30% with the aromatic hydrocarbons named above. The liquid film of the resulting solution is heated at a temperature of about 200–600° F. to produce a smooth continuous coating.

The acyl halide derivatives is reacted in the phenol or alkyl substituted phenols solvent with an aromatic diamine having one or more aromatic ring and two primary amino groups. These aromatic diamines have the formula $H_2N—R'—NH_2$, $H_2N—R'—O—R'—NH_2$
$H_2N—R'—CH_2—R'—NH_2$

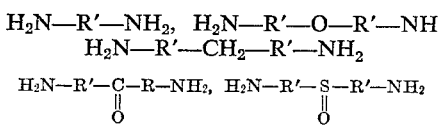

and $H_2N—R'—S—R'—NH_2$ wherein R' is a divalent aromatic hydrocarbon radical hereinbefore indicated. The aromatic content of the diamine provides the thermal properties in the polymer while the primary amino groups permit the desired imide rings and the amide linkages to be formed in the polymer. Generally the aromatic diamine has from one to about four aromatic rings, advantageously from one to about two aromatic rings. The aromatic diamines having more than one aromatic ring may be further characterized as polycyclic aromatic compounds having two primary aromatic rings which may be interconnected by condensation, as in naphthalene or phenanthrene type structures, or may be bridged, either directly as in diphenyl diamines, or indirectly as, for example, two R' groups joined with reactive stable inert linkages such as oxy, alkyl, carbonyl, sulfonyl and other relatively inactive groups such as sulfide group, as hereinbefore described. The alkyl group may be illustrated by methylene, ethylene, substituted derivatives such as 1,1-dimethylmethylene, and the like. Suitable nuclei, the R' divalent aromatic hydrocarbon radical, include phenylene, naphthalene, anthrylene, naphthacenylene and the like; diphenylene, terephenylene, phenylnaphthalene, quaterphenylene and the like; and aromatic rings separated by oxy, carbyl, carbonyl, sulfonyl and thio groups.

Advantageously, the linkages between the aromatic groups are oxy, or methylene, and the amino groups are in the meta or para position in the aromatic nucleus. The polyamide polymers have molecular weights above about 7,000 and the polyamide-imide polymers have molecular weight in excess of about 9,000. The defined polyamide of the first reaction as described hereinabove is soluble in organic solvents. Using the aromatic carbocyclic alcohols as solvents, solutions containing about 12 to about 30 percent solids by weight are obtainable. For applications requiring use of solutions for producing wire coatings, impregnating varnishes and the like, solutions of about 15 to about 25 weight percent and advantageously about 18 percent are desired. Such concentrations provide solutions with a good balance between solids content and solution viscosity for ease of handling in most practical applications. The viscosities for such solutions are in the range of about 3 to about 150 poises. For example, the viscosity of phenol-cresol solutions having about 17 percent solids is about 30 poises at a temperature of 25° C.

By way of a particular example, 2.21 moles of the 4-acid chloride of trimellitic anhydride is added to a solution of 2.21 moles of p,p'-methylenebis(aniline) in 3,090 cc. of cresylic acid in a solvent containing ortho, meta or para-cresol. The addition is carried out over a period of about one to two hours. After the addition is complete a vacuum of about 100–140 mm. of mercury is applied and with an air flow rate of about 30 cc. per minute and the heating is continued for one hour at about 50° C. The temperature is then increased to about 70° C. and this temperature is maintained for ½ hour to allow slow hydrogen chloride removal. In about 20 minutes a precipitate forms and remains in suspension until later stages of conditioning at more elevated temperatures. The reaction temperature is then increased to about 100° C. and held to allow solution of the insoluble material. This usually takes about two hours and allows reduction in hydrogen chloride level to 30%. A water separator is used to remove water of imidization which dissolves hydrogen chloride under reflux conditions which would otherwise retard hydrogen chloride removal and cause polymer degradation. The rate of hydrogen chloride removal can be followed by standard methods of chlorine analysis, but is most conveniently followed by titrations with alcoholic sodium methylate in N-methylpyrrolidone solvent using bromophenol blue (pH 3.0–4.6) which titrates only free hydrochloric acid. The solution viscosity during the reaction at 100° C. gradually increases. The temperature is reduced to about 25° C. and propylene oxide is added in about 5% excess. The amount is calculated from the acid titer value as follows: Wt. propylene oxide equals acid titer times 6.1 times weight solution divided by 100. The following examples illustrate some embodiments of this invention. It will be understood that these are for illustrative purposes only and do not purport to be wholly definitive with respect to conditions or scope.

EXAMPLE I

To a three liter flask equipped with a stirrer, water separator and suitable vacuum air bleed, was added 270 gm. (1.36 moles) of methylene bisaniline (MBA) and 1842 gm. of commercial grade cresylic acid containing about 50% phenol, about 30% o,m,p-cresol and about 20% xylenols. With stirring a clear solution was obtained and 288 gm. (1.36 moles) of the 4-acid chloride of trimellitic anhydride was added in portions over a period of 1¼ hours. The temperature gradually increased and was held at 50° C. With completion of addition a vacuum of 150 mm. was applied and temperature of 50° C. held for an additional hour. A slight air bleed of 7 cc./min. was employed. Temperature was then increased to 70° C. and held for one half hour, and was finally raised to 100° C. for an additional 2½ hours. An insoluble phase formed at 70° C. but redissolved after 1½ to 2 hours at 100° C. The clear solution was cooled to 25° C. and solution viscosity determined. A Gardner viscosity of 5.5 stokes was obtained.

Acid titer of the solution was determined by titration and a value of 0.198 milliequivalent per gram found. This corresponds to 31% of the theoretical amount of the hydrogen chloride generated. To 2263 gm. of the solution 27.3 gm. of propylene oxide was added and corresponds to a 5% excess. The propylene oxide was added dropwise over a one hour period and stirring continued overnight before viscosity determination. Gardner viscosity was 25 stokes at 25° C. at a 20.4% solids level. One mil films were cast directly from this solution, and gave tough, flexible films. A cure cycle of 30 minutes at 300° F., 5 minutes at 500° F., and finally 3 minutes at 600° F. was used. Tensile values were determined on ½" strips and were in the 13,900 p.s.i. range with 6% elongation according to ASTM methods D–882–64T.

EXAMPLE II

In a 1 liter flask equipped with a stirrer for vacuum operation were placed 92.4 gm. (0.466 mole) of methylene bisaniline (MBA) and 600 ml. of commercial grade cresylic acid containing about 50% phenol, 30% ortho, meta, para-cresol and 20% xylenols. The contents of the flask were heated to 90° C. and maintained at this temperature while 98.4 gm. (0.466 mole) of the 4-acid chloride of trimellitic anhydride (4–TMAC) was added over a period of 3½ hours. The flask was fitted so the addition could be made under vacuum conditions (120 mm. of Hg) to allow removal of generated hydrogen chloride as formed. Temperature was then gradually increased to 100° C. over a 30 minute period and the solution cooled to ambient temperatures for analysis.

The polymer solution at this point had a Gardner viscosity of 5.7 stokes at 25° C. and had an acid titer of 0.212 meq./g. and still contained approximately 33% of the theoretical amount of hydrogen chloride generated. This polymer solution was given an additional 2 hours of treatment at 100° C. to give the final polymer solution. Brookfield viscosity had increased to 13 poises at 25° C. Based on the acid titer of 0.137 meq./g. determined by titration methods, the solution now contains 23% residual hydrogen chloride of theory. An equivalent amount of propylene oxide, 2.86 gm. was added to 359 gm. of solution and this solution rolled on a roller mill. Viscosity increased to a Brookfield viscosity of 316 poises and had 22% solids.

Films were cast from solution by treating at 300°, 500° and 600° F. for 30, 5 and 3 minutes, respectively, and gave clear, tough, flexible films.

I claim:
1. In a process for producing a soluble polymer for use as a polyamide-imide wire enamel from an acid halide of a benzene tricarboxylic acid anhydride and an aromatic primary diamine wherein the aromatic radical consists essentially of divalent mono and poly aromatic hydrocarbons containing 1 to 4 aromatic rings wherein said multiple rings are joined directly or by members selected from the group consisting of oxy, sulfonyl, sulfur, carbonyl and lower alkylene groups, in which hydrogen halide is produced, essentially equimolar amounts of said tricarboxylic acid halide and diamine being reacted in phenol or a mixture of phenol and alkyl substituted phenols, the improvement in said process comprising reacting the tricarboxylic acid halide and diamine at a temperature of about 25 to 50° C. then heating the reaction mixture to about 50 to 110° C. under vacuum of about 50 to 180 mm. of mercury to partially remove the entrained hydrogen halide and then scavenging the residual entrained hydrogen halide with an alkylene oxide consisting of about 2 to 4 carbon atoms in a straight chain, thus reducing the corrosive tendencies of said hydrogen halide and improving the properties of said polymer.

2. Process of claim 1 wherein the acid halide is selected from the group consisting of acid chloride and acid bromide.

3. The process of claim 2 wherein the reaction mixture is heated to about 70 to 100° C. under vacuum of about 100 to 140 mm. of mercury.

4. The process of claim 2 wherein a vacuum of 100 to 140 mm. of mercury with an air bleed of 30 to 50 cc. per minute is maintained.

5. The process of claim 3 wherein the acid halide is acid chloride of trimellitic anhydride.

6. The process of claim 1 wherein said alkylene oxide is propylene oxide.

7. The process of claim 1 wherein said diamine is p,p'-methylenebis(aniline).

8. The process of claim 1 wherein said diamine is p,p'-oxybis(aniline).

9. The process of claim 1 wherein the acid halide and diamine are reacted at a temperature of 80 to 110° C. under vacuum of about 50 to 180 mm. of mercury to remove hydrogen halide as formed.

10. In a process for producing a soluble polymer for use as a polyamide-imide wire enamel from the 4-acid chloride of trimellitic anhydride and p,p'-methylenebis (aniline) in which hydrogen halide is produced, essentially equimolar amounts of the 4-acid chloride of trimellitic anhydride and p,p'-methylenebis(aniline) being reacted in phenol or a mixture of phenol and alkyl substituted phenols, the improvement in said process comprising reacting the 4-acid chloride of trimellitic anhydride and p,p'-methylenebis(aniline) at a temperature of about 25 to 50° C. then heating the reaction mixture to about 50–110° C. under vacuum of about 50–180 mm. of mercury to partially remove the entrained hydrogen halide and then scavenging the residual entrained hydrogen halide with propylene oxide, thus reducing the corrosive tendencies of said hydrogen halide and improving the properties of said polymer.

References Cited

UNITED STATES PATENTS 3,260,691  7/1966  Lavin et al.
3,347,828  10/1967  Stephens et al.

WILLIAM H. SHORT, Primary Examiner

L. L. LEE, Assistant Examiner

U.S. Cl. X.R.
260—65, 78